United States Patent
Henderson et al.

(10) Patent No.: US 9,932,143 B2
(45) Date of Patent: Apr. 3, 2018

(54) CARGO ORGANIZER WITH COLLAPSIBLE STORAGE COMPARTMENT

(71) Applicant: Toyota Tsusho America, Inc., New York, NY (US)

(72) Inventors: Brian E. Henderson, Farmington Hills, MI (US); Donald L. Munoz, Bloomfield Hills, MI (US)

(73) Assignee: Toyota Tsusho America, Inc., New York, NY (US)

( * ) Notice: Subject to any disclaimer, the term of this patent is extended or adjusted under 35 U.S.C. 154(b) by 0 days.

(21) Appl. No.: 15/477,451

(22) Filed: Apr. 3, 2017

(65) Prior Publication Data

US 2017/0291733 A1    Oct. 12, 2017

Related U.S. Application Data

(60) Provisional application No. 62/319,192, filed on Apr. 6, 2016.

(51) Int. Cl.
*B60R 5/00* (2006.01)
*B60R 7/00* (2006.01)
(Continued)

(52) U.S. Cl.
CPC .............. *B65D 11/186* (2013.01); *B60R 7/02* (2013.01); *B60R 7/04* (2013.01); *B60R 7/043* (2013.01);
(Continued)

(58) Field of Classification Search
CPC .............. B65D 11/186; B65D 11/1833; B65D 11/1873; B65D 13/00; B65D 11/18;
(Continued)

(56) References Cited

U.S. PATENT DOCUMENTS

| 593,404 | A | * | 11/1897 | Prechtel | B65D 9/14 217/15 |
| 810,574 | A | * | 1/1906 | Sewell | B65D 5/36 229/117.02 |

(Continued)

FOREIGN PATENT DOCUMENTS

| DE | 10021151 A1 | 4/2002 |
| FR | 2716847 A1 | 9/1995 |
| FR | 2946929 A1 | 12/2010 |

OTHER PUBLICATIONS

International Search Report for co-pending patent application Serial No. PCT/US2017/025867, dated Jun. 7, 2017.

*Primary Examiner* — Jennifer E. Novosad
(74) *Attorney, Agent, or Firm* — Christopher G. Darrow; Darrow Mustafa PC

(57) ABSTRACT

A cargo organizer includes a base, a storage compartment supported by the base and a deployment system for the storage compartment. The storage compartment includes a plurality of wall panels each having a hinged connection with the base and pivotable about its hinged connection between a stowed orientation and an upright orientation. The storage compartment is selectively deployable between a collapsed condition and an open condition. In the collapsed condition, each wall panel is lowered to its stowed orientation while, in the open condition, each wall panel is raised to its upright orientation. In the collapsed condition, the wall panels include an underlying wall panel and two adjacent overlying wall panels in spaced opposition about the underlying wall panel. The deployment system includes a strap system that connects an inboard portion of the underlying wall panel to respective outboard portions of the two adjacent overlying wall panels.

20 Claims, 8 Drawing Sheets

(51) Int. Cl.
*B60R 9/00* (2006.01)
*B65D 6/18* (2006.01)
*B60R 7/04* (2006.01)
*B60R 7/08* (2006.01)
*B65D 6/24* (2006.01)
*B65D 13/00* (2006.01)
*B60R 7/02* (2006.01)

(52) U.S. Cl.
CPC ............ *B60R 7/08* (2013.01); *B65D 11/1833* (2013.01); *B65D 11/1873* (2013.01); *B65D 13/00* (2013.01)

(58) Field of Classification Search
CPC ............ B65D 11/1806; B65D 11/1866; B65D 11/1846; B65D 11/1893; B60R 7/02; B60R 7/04; B60R 7/043; B60R 7/08; B60R 7/005; B60R 5/045; B60R 9/04; B60R 9/06
USPC .... 220/6, 7, 507; 296/37.5, 37.7, 37.1, 37.6, 296/37.8, 37.14, 24.3, 37.15; 224/320, 224/324–326, 498, 539, 542, 925; 383/24, 119, 903, 120
See application file for complete search history.

(56) References Cited

U.S. PATENT DOCUMENTS

| | | | |
|---|---|---|---|
| 915,704 A * | 3/1909 | Scott et al. ........ | B65D 11/1833 220/7 |
| 1,122,858 A | 12/1914 | Chamberlin | |
| 1,202,253 A * | 10/1916 | Vitt ......................... | B65D 7/26 220/6 |
| 1,241,844 A * | 10/1917 | Gottschall ........ | B65D 11/1833 220/7 |
| 1,314,862 A * | 9/1919 | Eyler ................ | B65D 11/1833 220/7 |
| 3,319,684 A * | 5/1967 | Calhoun ................ | A61J 1/05 190/107 |
| 3,376,994 A * | 4/1968 | Flinn, Jr. ................. | B65D 9/14 217/14 |
| 5,515,987 A * | 5/1996 | Jacques ............. | B65D 11/1833 220/6 |
| 5,538,148 A * | 7/1996 | Indyk ..................... | B60P 7/135 211/12 |
| 5,622,276 A * | 4/1997 | Simmons ........... | B65D 11/1833 220/495.08 |
| 5,725,119 A * | 3/1998 | Bradford ................ | B65D 1/225 206/583 |
| 6,015,071 A * | 1/2000 | Adomeit ................... | B60R 7/02 220/6 |
| 6,053,553 A * | 4/2000 | Hespelt ..................... | B60R 7/02 296/37.1 |
| 6,308,873 B1 * | 10/2001 | Baldas ...................... | B60R 7/02 217/15 |
| 6,488,168 B1 * | 12/2002 | Wang ........................ | B60R 7/02 220/6 |
| 6,890,015 B2 * | 5/2005 | Carlsson .................. | B60R 5/04 296/37.14 |
| 6,899,237 B2 * | 5/2005 | Trent .................... | A47C 19/005 211/184 |
| 6,921,119 B2 * | 7/2005 | Haspel ..................... | B60R 5/04 296/24.4 |
| 7,093,873 B2 * | 8/2006 | Nilsrud .................... | B60R 7/02 296/37.14 |
| 7,201,421 B2 * | 4/2007 | Reynolds ................ | B60R 7/02 224/400 |
| D547,715 S * | 7/2007 | Faber ......................... | D12/426 |
| 7,429,078 B1 * | 9/2008 | Tarlow .................... | B60R 7/043 224/275 |
| 8,215,693 B2 * | 7/2012 | Ulita ........................ | B60R 7/02 296/37.1 |
| 8,651,309 B2 * | 2/2014 | Gualersi ............ | B65D 11/1833 220/4.28 |
| 9,527,626 B1 * | 12/2016 | Coronado ............ | A45C 7/0036 |
| 2003/0075541 A1 | 4/2003 | Bartasevich, Jr. et al. | |
| 2004/0140334 A1 * | 7/2004 | Drane ...................... | B60R 7/02 224/542 |
| 2005/0087530 A1 * | 4/2005 | Svenson .................... | B60R 7/02 220/6 |
| 2006/0038423 A1 | 2/2006 | Nilsrud | |
| 2007/0095826 A1 * | 5/2007 | Truong .................... | B60R 7/02 220/7 |
| 2007/0157534 A1 * | 7/2007 | Green ...................... | B60R 7/02 52/270 |
| 2007/0241154 A1 * | 10/2007 | Potts ........................ | B60R 7/02 224/539 |
| 2016/0144800 A1 * | 5/2016 | Henderson ............ | B60R 13/013 296/24.4 |
| 2017/0291733 A1 * | 10/2017 | Henderson ......... | B65D 11/1833 |

* cited by examiner

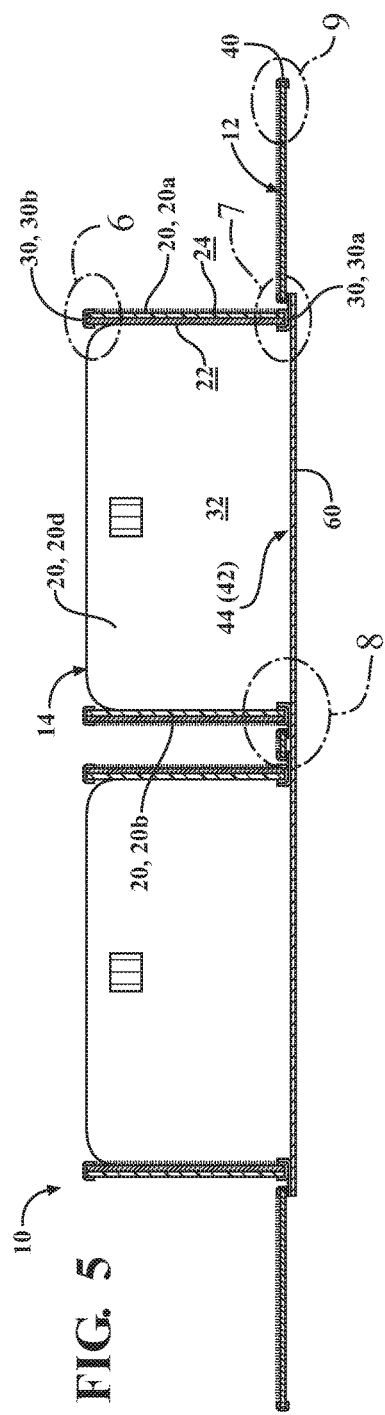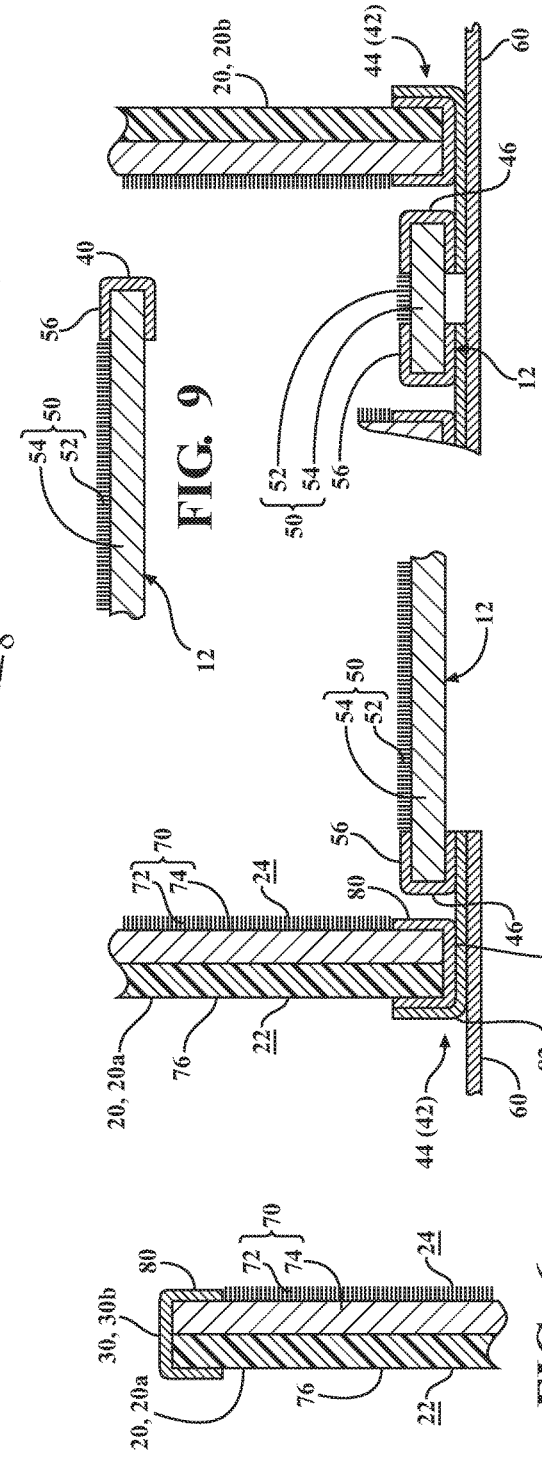

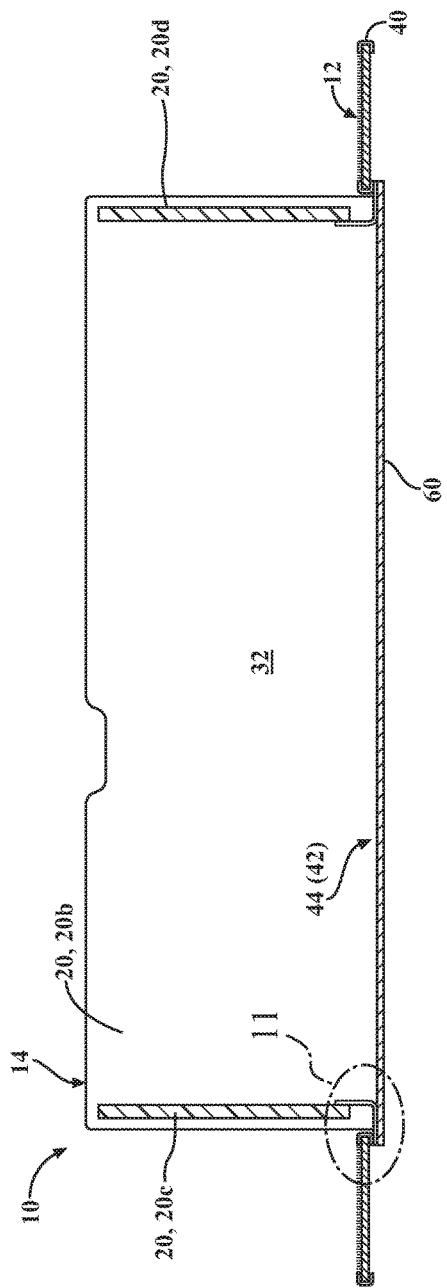
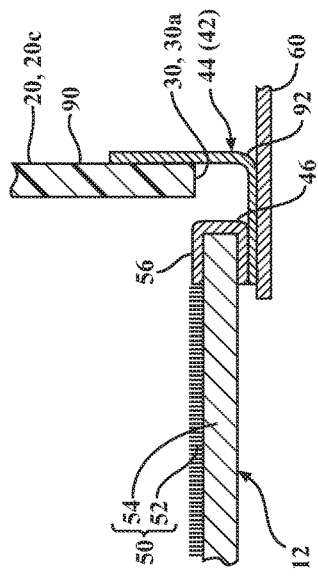
FIG. 10
FIG. 11

CARGO ORGANIZER WITH COLLAPSIBLE STORAGE COMPARTMENT

CROSS REFERENCE TO RELATED APPLICATIONS

This application claims benefit of U.S. Provisional Application No. 62/319,192, filed on Apr. 6, 2016, which is herein incorporated by reference in its entirety.

BACKGROUND

Vehicles may include various inner compartments that provide storage spaces for objects. For example, a sedan may include an enclosed trunk that is separate from its passenger compartment. A sport utility vehicle (SUV) or van, on the other hand, may include a rear cargo area behind its rear passenger seats that is open to its passenger compartment. To better secure objects and otherwise enhance the usability of the storage spaces provided by their inner compartments, these vehicles may include features for subdividing their inner compartments into smaller compartments. However, the features for subdividing the inner compartments may themselves occupy the storage spaces they provide or otherwise interfere with the use of the storage spaces. Moreover, it may not be convenient, or possible, to convert the subdivided inner compartments into un-subdivided inner compartments that provide larger storage spaces.

SUMMARY

Disclosed are embodiments of a cargo organizer. In one aspect, a cargo organizer includes a base, a storage compartment supported by the base and a deployment system for the storage compartment. The storage compartment includes a plurality of wall panels each having a hinged connection with the base and pivotable about its hinged connection between a stowed orientation and an upright orientation. The storage compartment is selectively deployable between a collapsed condition and an open condition. In the collapsed condition, each wall panel is lowered to its stowed orientation while, in the open condition, each wall panel is raised to its upright orientation. In the collapsed condition, the wall panels include an underlying wall panel and two adjacent overlying wall panels in spaced opposition about the underlying wall panel. The deployment system includes a strap system that connects an inboard portion of the underlying wall panel to respective outboard portions of the two adjacent overlying wall panels.

In another aspect, a cargo organizer includes a base, a storage compartment supported by the base and a deployment system for the storage compartment. The storage compartment includes a plurality of wall panels each having a hinged connection with the base and pivotable about its hinged connection between a stowed orientation and an upright orientation. The storage compartment is selectively deployable between a collapsed condition and an open condition. In the collapsed condition, each wall panel is lowered to its stowed orientation while, in the open condition, each wall panel is raised to its upright orientation. In the collapsed condition, the wall panels include an overlying wall panel and two adjacent underlying wall panels in spaced opposition about the overlying wall panel. The deployment system includes a first strap system that connects an inboard portion of a first of the two adjacent underlying wall panels to a first outboard portion of the overlying wall panel, and a second strap system that connects an inboard portion of a second of the two adjacent underlying wall panels to a second outboard portion of the overlying wall panel.

In yet another aspect, a cargo organizer includes a base, a storage compartment supported by the base and a deployment system for the storage compartment. The storage compartment includes a first side wall panel and a second side wall panel in spaced opposition, and a first end wall panel and a second end wall panel in spaced opposition. Each has a hinged connection with the base at respective bottom edges thereof that are arranged end-to-end in a substantially closed loop and, while pivotable about its bottom edge between a stowed orientation and an upright orientation, is generally not foldable over itself. The storage compartment is selectively deployable between a collapsed condition and an open condition. In the collapsed condition, the first end wall panel and the second end wall panel are lowered towards each other to their stowed orientations, and the first side wall panel and the second side wall panel are lowered towards each other to their stowed orientations in an overlying relationship with the first end wall panel and the second end wall panel, with the first side wall panel and the second side wall panel having immediately adjacent top edges opposite their respective bottom edges. In the open condition, each wall panel is raised to its upright orientation. The deployment system includes a first strap system that connects an inboard portion of the first end wall panel to respective outboard portions of the first side wall panel and the second side wall panel substantially without slack, and a second strap system that connects an inboard portion of the second end wall panel to respective opposing outboard portions of the first side wall panel and the second side wall panel substantially without slack. However, the first side wall panel, the second side wall panel, the first end wall panel and the second end wall panel are not otherwise interconnected for movement.

These and other aspects will be described in additional detail below.

BRIEF DESCRIPTION OF THE DRAWINGS

The various features, advantages and other uses of the present apparatus will become more apparent by referring to the following detailed description and drawing, in which:

FIG. 5 is a cross sectional view of the cargo organizer taken along section line 5-5 of FIG. 4, showing aspects its construction;

FIG. 6 is an enlarged partial cross sectional view of a portion of the cargo organizer identified by the number 6 in FIG. 5;

FIG. 7 is an enlarged partial cross sectional view of a portion of the cargo organizer identified by the number 7 in FIG. 5;

FIG. 8 is an enlarged partial cross sectional view of a portion of the cargo organizer identified by the number 8 in FIG. 5;

FIG. 9 is an enlarged partial cross sectional view of a portion of the cargo organizer identified by the number 9 in FIG. 5;

FIG. 10 is a cross sectional view of the cargo organizer taken along section line 10-10 of FIG. 4, showing additional aspects of its construction;

FIG. 11 is an enlarged partial cross sectional view of a portion of the cargo organizer identified by the number 11 in FIG. 10;

DETAILED DESCRIPTION

Figure 1:
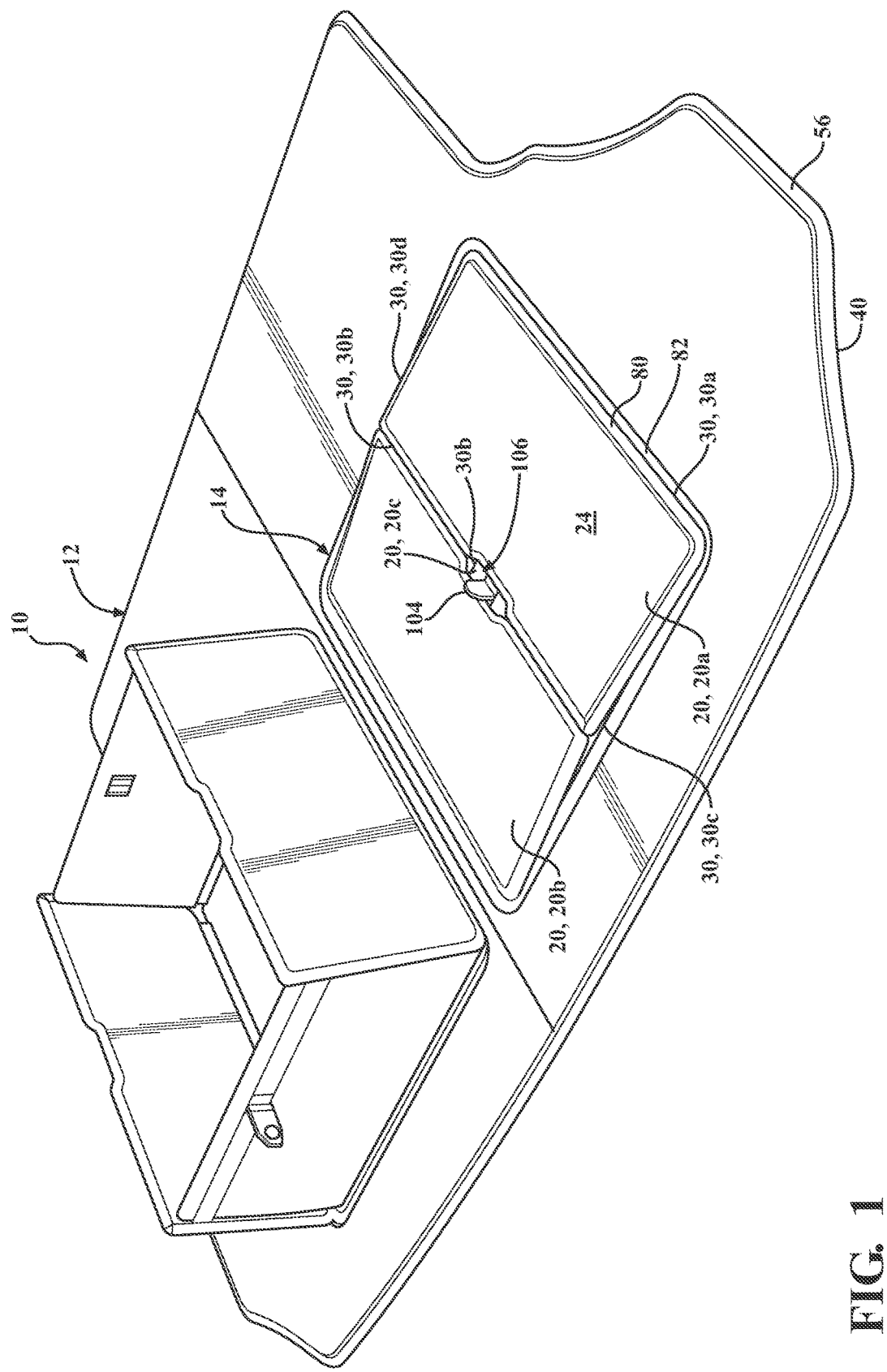
FIG. 1 is a perspective view of an example of a cargo organizer with two collapsible storage compartments that are selectively deployable between a collapsed condition and an open condition, and that include deployment systems that support their deployment, showing one storage compartment deployed to its open condition, and the other storage compartment deployed to its collapsed condition.

Disclosed is a cargo organizer for securing objects in a trunk, rear cargo area or other inner compartment that provides storage space in a vehicle. The cargo organizer may include one or more collapsible storage compartments. The storage compartments include wall panels subject to movement between an upright orientation and a stowed orientation. The storage compartments are selectively deployable between a collapsed condition, where each of their wall panels is lowered to its stowed orientation, and an open condition, where each of their wall panels is raised to its upright orientation. The storage compartments include deployment systems that support their deployment. The deployment systems include, among other things, strap systems that interconnect the wall panels of the storage compartments in a manner that supports their one-handed deployment.

Referring now to the discussion that follows and also to the drawing, illustrative approaches to the disclosed systems and methods are shown in detail. Although the drawing represents some possible approaches, the drawing is not necessarily to scale and certain features may be exaggerated, removed, or partially sectioned to better illustrate and explain the present invention. Further, the discussion set forth herein is not intended to be exhaustive or otherwise limit or restrict the claims to the precise forms and configurations shown in the drawing and disclosed in the detailed description.

With reference to FIGS. 1-4 and 12, an exemplary cargo organizer 10 may include a base 12 and one or more generally rectangular shaped, collapsible storage compartments 14 supported by the base 12 for securing objects within an inner compartment that provides storage space in a vehicle. The illustrated example of the cargo organizer 10 includes two storage compartments 14 positioned adjacent to each other. In practice, the cargo organizer 10 may include fewer or more storage compartments 14. The number of storage compartments 14, and their arrangement relative to each other, may be varied to suit the design and performance requirements of a particular application. As shown, each of the storage compartments 14 may be selectively deployed between a collapsed condition and an open condition.

The storage compartments 14 may have substantially similar configurations. Accordingly, for purposes expediency, the configuration of one storage compartment 14, and related features of the remainder of the cargo organizer 10, will be described, with the understanding that the other storage compartment 14 may be substantially similarly configured, and that the remainder of the cargo organizer 10 may have substantially similar related features with respect to the other storage compartment 14.

The storage compartment 14 includes a number of wall panels 20a-d (referred to collectively as the wall panels 20 except where differentiated to facilitate discussion). Each of the wall panels 20 is generally planar, with an inside 22 and an outside 24 (identified on the wall panel 20a and otherwise only where needed to facilitate discussion with the understanding that the remaining wall panels 20 similarly have insides and outsides), and with a peripheral edge 30 including a bottom edge 30a and an opposing top edge 30b, as well as adjacent opposing, spaced apart side edges 30c and 30d (identified on the wall panel 20a and otherwise only where needed to facilitate discussion with the understanding that the remaining wall panels 20 similarly have peripheral edges).

Each of the wall panels 20 has a hinged connection to the base 12, at its bottom edge 30a, about which it is hingeably connected to the base 12 for selective pivotal movement. With this configuration, each of the wall panels 20 may be raised to an upright orientation, and lowered to a stowed orientation. Accordingly, the wall panels 20 may, collectively, be unfolded and folded with respect to one another, without the individual wall panels 20 being generally foldable over themselves.

The bottom edges 30a of the wall panels 20 are arranged end-to-end in a substantially closed loop. Together, in their upright orientations, the wall panels 20 bound, by their insides 22, a generally rectangular shaped interior region 32 of the storage compartment 14 for securing objects, with their top edges 30b arranged end-to-end in a substantially closed loop to frame an opening to the interior region 32.

The illustrated example of the storage compartment 14 has four wall panels 20, including a first side wall panel 20a and an opposing, spaced apart second side wall panel 20b, as well as a first end wall panel 20c and an opposing, spaced apart second end wall panel 20d. The first side wall panel 20a and the second side wall panel 20b may be raised away from each other to their upright orientations, or lowered towards each other to their stowed orientations. Similarly, the first end wall panel 20c and the second end wall panel 20d may be raised away from each other to their upright orientations, or lowered towards each other to their stowed orientations.

In this and other examples of the storage compartment 14, relative to a given wall panel 20, there are two adjacent wall panels 20. For instance, for the illustrated example of the storage compartment 14, the first side wall panel 20a has the first end wall panel 20c and the second end wall panel 20d adjacent to it. The second side wall panel 20b similarly has the first end wall panel 20c and the second end wall panel 20d adjacent to it. Moreover, the first end wall panel 20c has the first side wall panel 20a and the second side wall panel 20b adjacent to it. The second end wall panel 20d similarly has the first side wall panel 20a and the second side wall panel 20b adjacent to it.

The base 12 of the cargo organizer 10 may be sized, shaped and otherwise configured to overlay a vehicle surface that defines an inner compartment of the vehicle into which the cargo organizer 10 is arranged. In a cargo mat configuration of the cargo organizer 10, the vehicle surface may include, for example, the floor or other generally horizontal surface of a trunk, a rear cargo area or other inner compartment that provides storage space in the vehicle. The vehicle surface may also include an exterior surface, such as the bed of a pickup truck, for example.

At least a portion of the base 12 may extend beyond the footprint of the interior region 32 of the storage compartment 14. The base 12 has an outer edge 40 that defines its outer perimeter. The outer edge 40 may have a contour matching or otherwise accommodating surface features of the inner compartment of the vehicle into which the cargo organizer 10 is arranged to provide an integrated custom appearance and feel between the vehicle and the cargo organizer 10. The base 12 may alternatively be configured to have substantially the same size and shape as the storage compartment 14, with little or no portion of the base 12 extending beyond the footprint of its interior region 32.

With additional reference to FIGS. 5 and 10, the base 12 may define a recess 42 coinciding with the storage compartment 14, into which one, some or all of its wall panels 20 may be raised from and lowered into. In the case where each of the wall panels 20 may be raised from and lowered into the recess 42, each of the wall panels 20 may be raised about its hinged connection with the base 12, from the recess 42 and away from the interior region 32, to its upright orientation, as well as lowered about its hinged connection with the base 12, towards the interior region 32 and into the recess 42, to its stowed orientation.

Figure 12:
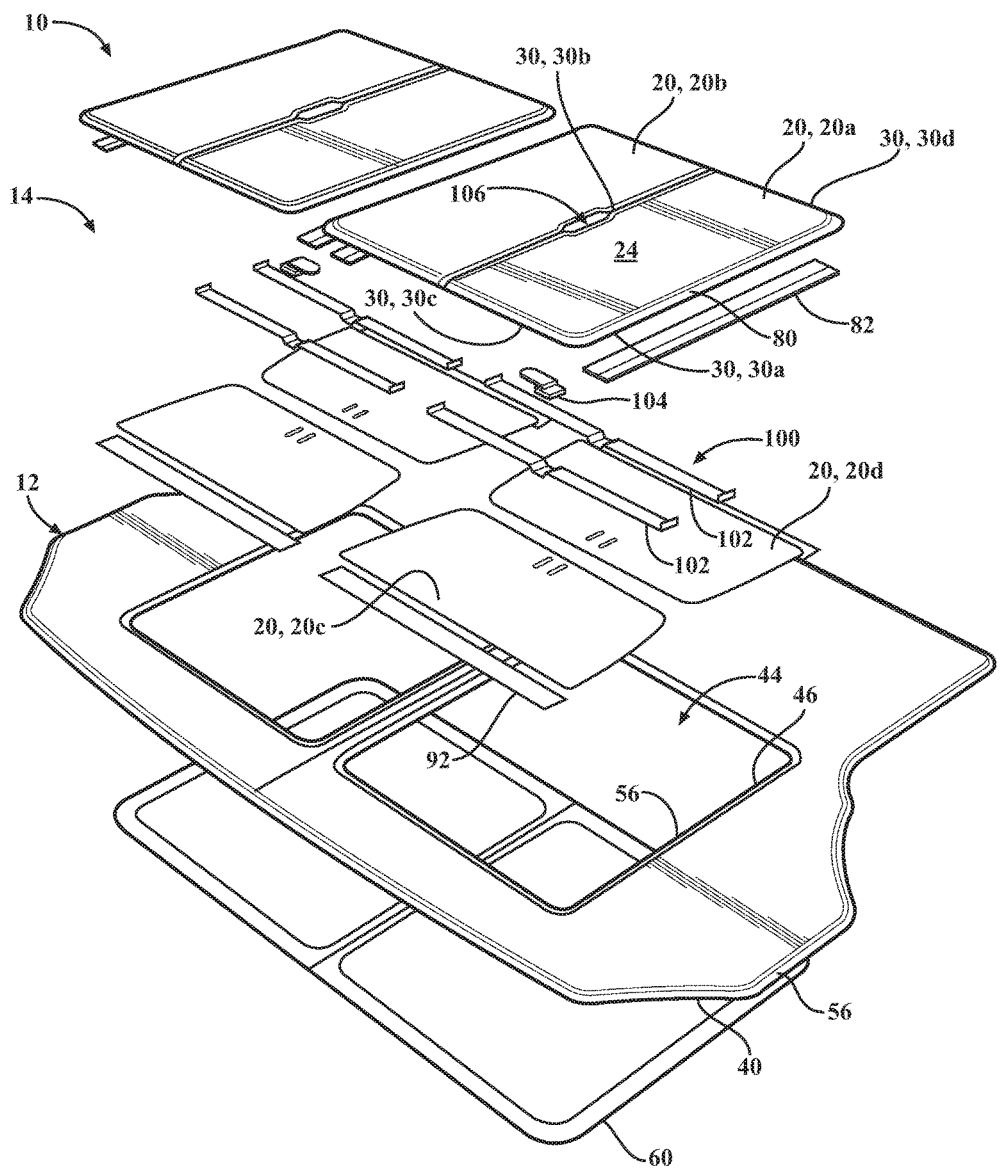
FIG. 12 is an exploded view of the cargo organizer.

With reference primarily to FIG. 12, the recess 42 may be framed by an interior opening 44 in the base 12 coinciding with the storage compartment 14. The base 12 has an interior edge 46 that defines the perimeter of its interior opening 44. The interior opening 44 may be sized larger than the storage compartment 14, such that the interior edge 46 extends around the footprint of the interior region 32 of the storage compartment 14.

The base 12 may be constructed partially or entirely from generally flexible materials, such as rubber, woven nylon fabric, cotton or polyethylene, for example. In this and other examples, as shown with additional reference to FIGS. 7-9, the base 12 may be constructed from carpeting 50 having a layer of pile 52 attached to a backing 54. The base 12 may include other materials, such as an additional rubber backing pad applied to the underside of the carpeting 50, that ultimately rest on a vehicle surface.

Various techniques and mechanisms may be employed for protecting or otherwise finishing the edges of the carpeting 50 to help prevent fraying or unraveling of the pile 52 and the backing 54, and to provide an aesthetically pleasing finished appearance. For instance, a binding 56 or other finishing material may be applied to the otherwise exposed edges of the carpeting 50 along the outer edge 40 and the interior edge 46 of the base 12. The binding 56 may be wrapped around the edges of the carpeting 50 and secured in place by stitching or another suitable attachment mechanism, such as an adhesive. The binding 56 may be made from various materials, including but not limited to polyester and cotton, as well as other suitable materials. Alternatively, serging could be applied to the edges of the carpeting 50, for instance, by wrapping a thick fiber thread around them.

The cargo organizer 10 may include a pad 60 positioned across the interior opening 44 in the base 12. The pad 60 may be connected to the underside of the base 12 along its perimeter, among other places, by stitching or another suitable attachment mechanism, such as an adhesive. The pad 60 may be sized, shaped and otherwise configured to cover the interior opening 44 in the base 12, as well as partially or entirely underlay the remainder of the base 12. The pad 60 may be constructed partially or entirely from generally flexible materials, such as rubber, woven nylon fabric, cotton or polyethylene, for example.

The first side wall panel 20a and the second side wall panel 20b may have substantially similar configurations. Accordingly, for purposes expediency, the configuration of the first side wall panel 20a, and related features of the remainder of the cargo organizer 10, will be described, with the understanding that the second side wall panel 20b may be substantially similarly configured, and that the remainder of the cargo organizer 10 may have substantially similar related features with respect to the second side wall panel 20b.

The first side wall panel 20a may be constructed partially or entirely from generally flexible materials, such as rubber, woven nylon fabric, cotton or polyethylene, for example. In this and other examples, as shown with additional reference to FIG. 6, the first side wall panel 20a may be constructed from carpeting 70 having a layer of pile 72 attached to a backing 74, as well as a backing pad 76 applied to the underside of the carpeting 70. The backing pad 76 may be constructed from a flexible resilient material, such as rubber. With this configuration, the backing pad 76 forms the inside 22 of the first side wall panel 20a, while the carpeting 70 forms its outside 24. The carpeting 70 and the backing pad 76 may be similarly sized, or one may be sized larger or smaller than the other.

Various techniques and mechanisms may be employed for protecting or otherwise finishing the edges of the backing pad 76 and the carpeting 70 to help prevent fraying or unraveling of the pile 72 and the backing 74 of the carpeting 70, and to provide an aesthetically pleasing finished appearance. For instance, a binding 80 or other finishing material may be applied to the otherwise exposed edges of the backing pad 76 and the carpeting 70 along the peripheral edge 30 of the first side wall panel 20a, including the bottom edge 30a, the top edge 30b and the side edges 30c and 30d. The binding 80 may be wrapped around the edges of the backing pad 76 and the carpeting 70 and secured in place by stitching or another suitable attachment mechanism, such as an adhesive. The binding 80 may be made from various materials, including but not limited to polyester and cotton, as well as other suitable materials. Alternatively, serging could be applied to the edges of the backing pad 76 and the carpeting 70, for instance, by wrapping a thick fiber thread around them.

With reference primarily to FIGS. 7, 8 and 12, the first side wall panel 20a is hingeably connected to the base 12, at its bottom edge 30a, by a hinge 82. The hinge 82 may be constructed partially or entirely from generally flexible materials, such as rubber, woven nylon fabric, cotton or polyethylene, for example. The hinge may have a first side connected to the bottom edge 30a of the first side wall panel 20a, and a second side connected to the base 12. The hinge may extend an entire length of the bottom edge 30a of the first side wall panel 20a, or only one or more smaller portions of the bottom edge 30a.

The first side of the hinge 82 may be connected to the binding 80 applied to the edges of the backing pad 76 and the carpeting 70 of the first side wall panel 20a along its bottom edge 30a. The second side of the hinge 82 may be connected between the pad 60 and the binding 56 applied to the edge of the carpeting 50 of the base 12 along its interior edge 46. The hinge 82 may be secured in place by stitching or another suitable attachment mechanism, such as an adhesive. One single stitching operation could be used to connect the first side of the hinge 82, the pad 60, the binding 80 and the edges of the backing pad 76 and the carpeting 70 of the first side wall panel 20a to which the binding 80 is applied. Another single stitching operation could be used to connect the second side of the hinge 82, the pad 60, the binding 56 and the edge of the carpeting 50 of the base 12 to which the binding 56 is applied.

The first end wall panel 20c and the second end wall panel 20d may have substantially similar configurations. Accordingly, for purposes expediency, the configuration of the first end wall panel 20c, and related features of the remainder of the cargo organizer 10, will be described, with the understanding that the second end wall panel 20d may be substantially similarly configured, and that the remainder of the cargo organizer 10 may have substantially similar related features with respect to the second end wall panel 20d.

The first end wall panel 20c may be constructed partially or entirely from generally rigid or semi rigid material, such as high density polyethylene (HDPE), for example. In this and other examples, as shown with additional reference to FIGS. 10 and 11, the first end wall panel 20c may be formed from a sheet 90. With this configuration, the sheet 90 forms both the inside 22 and the outside 24 of the first side wall panel 20a.

With reference primarily to FIGS. 11 and 12, the first end wall panel 20c is hingeably connected to the base 12, at its bottom edge 30a, by a hinge 92. The hinge 92 may be constructed partially or entirely from generally flexible materials, such as rubber, woven nylon fabric, cotton or polyethylene, for example. The hinge 92 may have a first side connected to the bottom edge 30a of the first end wall panel 20c, and a second side connected to the base 12. The hinge 92 may extend an entire length of the bottom edge 30a of the first end wall panel 20c, or only one or more smaller portions of the bottom edge 30a.

The first side of the hinge 92 may be connected to the sheet 90 forming the first end wall panel 20c along its bottom edge 30a. The second side of the hinge 92 may be connected between the pad 60 and the binding 56 applied to the edge of the carpeting 50 of the base 12 along its interior edge 46. The hinge 92 may be secured in place by stitching or another suitable attachment mechanism, such as an adhesive. One single stitching operation could be used to connect the second side of the hinge 92, the pad 60, the binding 56 and the edge of the carpeting 50 of the base 12 to which the binding 56 is applied.

Figure 2:
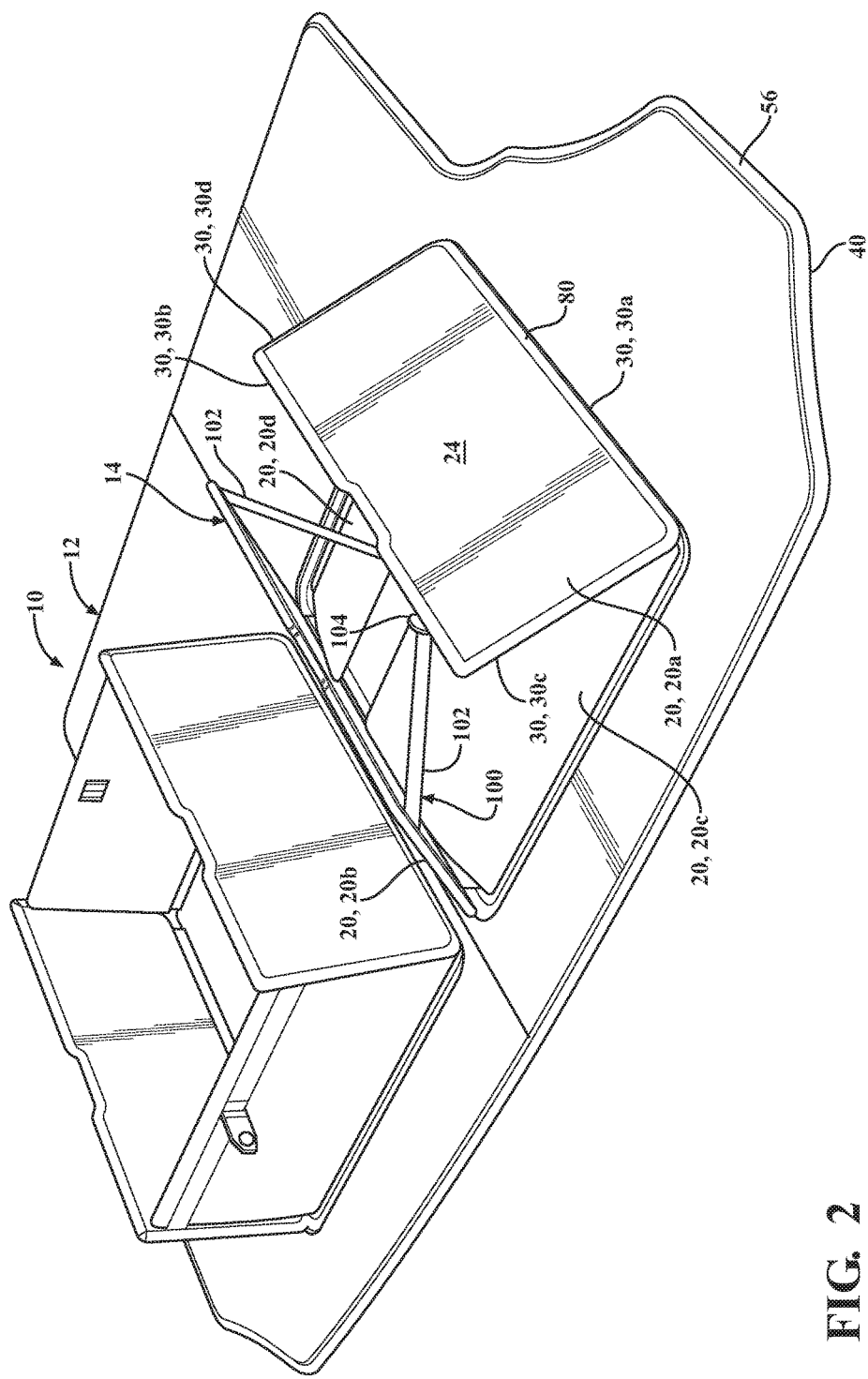
FIGS. 2-4 are additional perspective views of the cargo organizer, showing progressive stages of the deployment of the other storage compartment from its collapsed condition to its open condition via its deployment system, with FIG. 4 showing both of the storage compartments deployed to their open conditions.
Figure 3:
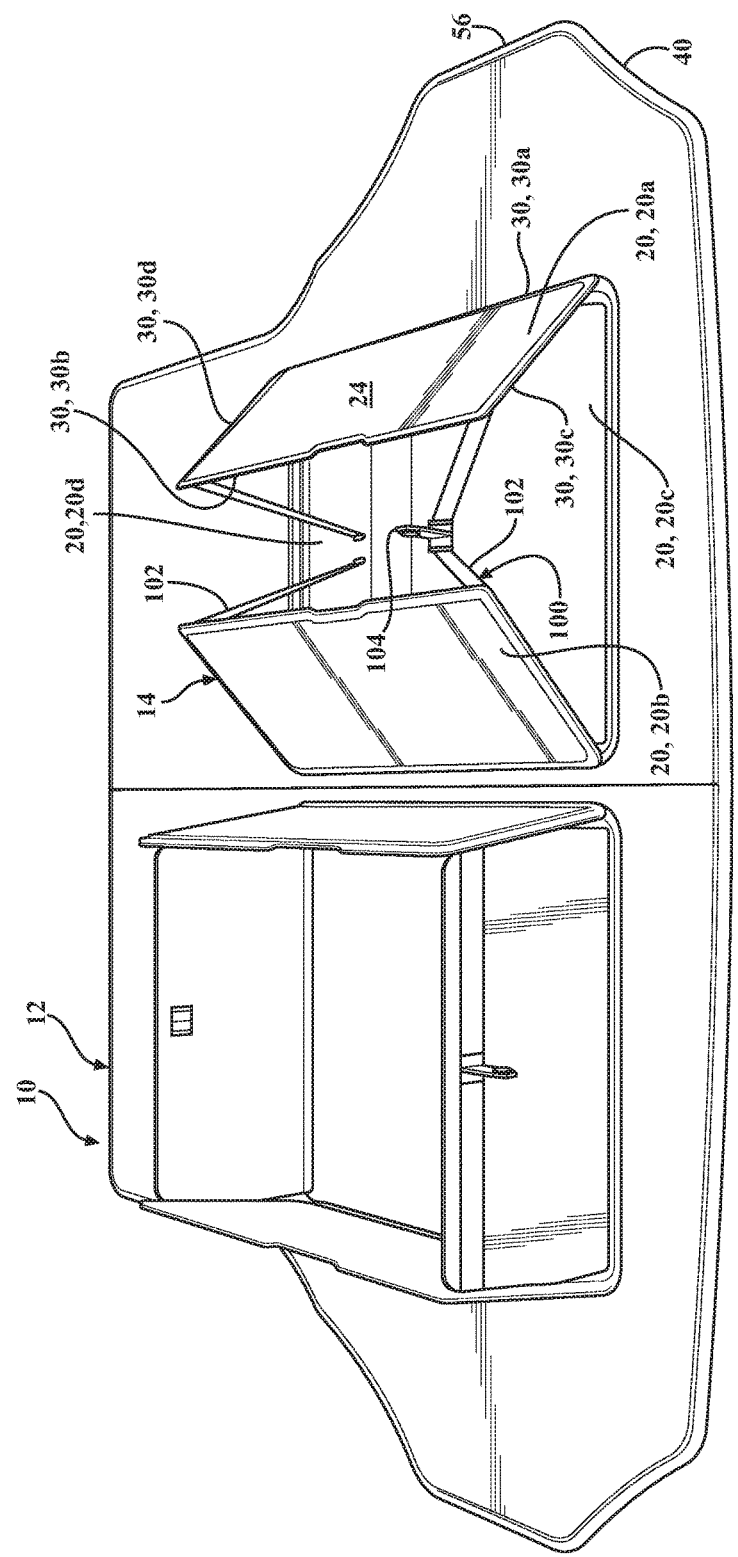
Figure 4:
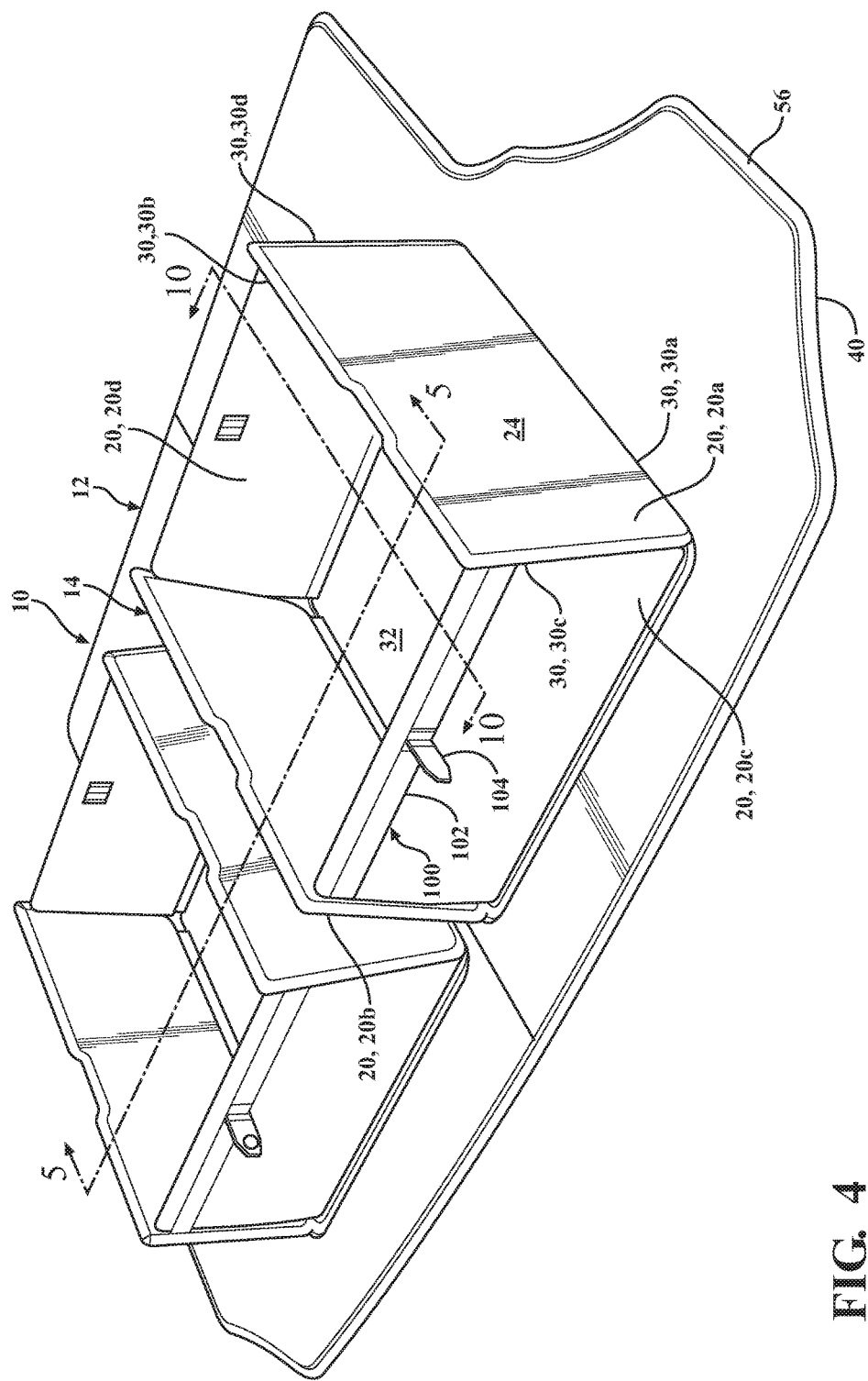

By raising and lowering its wall panels 20, the storage compartment 14 may be selectively deployed between a collapsed condition, where each of the wall panels 20 is lowered to its stowed orientation, and an open condition, where each of the wall panels 20 is raised to its upright orientation. The progressive stages of this deployment are shown in FIGS. 2-4.

Generally speaking, the storage compartment 14 has some overlying wall panels 20 and some underlying wall panels 20. In the collapsed condition of the storage compartment 14, where each of its wall panels 20 is lowered to its stowed orientation, the overlying wall panels 20 overly the underlying wall panels 20 and, as a corollary, the underlying wall panels 20 are overlaid by the overlying wall panels 20. Relative to a given overlying wall panel 20, there are two adjacent underlying wall panels 20 and, relative to a given underlying wall panel 20, there are two adjacent overlying wall panels 20.

In the configuration of the cargo organizer 10 where the base 12 defines the recess 42 into which the wall panels 20 may be lowered into, the outsides 24 of the overlying wall panels 20 may be flush or otherwise contiguous with the base 12 when the storage compartment 14 is in its collapsed condition, and its wall panels 20 are in their stowed orientations. In the same or other configurations of the cargo organizer 10, the overlying wall panels 20 may be sized so their top edges 30b are immediately adjacent to each other when the storage compartment 14 is in its collapsed condition, and its wall panels 20 are in their stowed orientations.

In the illustrated example of the storage compartment 14, the storage compartment 14 has the first side wall panel 20a and the second side wall panel 20b as its overlying wall panels 20, and the first end wall panel 20c and the second end wall panel 20d as its underlying wall panels 20.

The storage compartment 14 includes a deployment system 100 that enables or otherwise supports its deployment. The deployment system 100 may, for example, support one-handed deployment of the storage compartment 14. In that instance, with the deployment system 100, a user can initiate deployment of the storage compartment 14 by raising or lowering one of its wall panels 20. In the case where this so-called deployment initiating wall panel 20 is raised, the deployment system 100 raises at least one of the remaining wall panels 20. Similarly, in the case where the deployment initiating wall panel 20 is lowered, the deployment system 100 lowers at least one of the remaining wall panels 20.

In both cases, the deployment system 100 is directly or indirectly responsive to the deployment initiating wall panel 20 being raised or lowered, as the case may be. Any of the remaining wall panels 20 not raised or lowered by the deployment system 100 may be raised or lowered, directly or indirectly responsive to the deployment initiating wall panel 20 being raised or lowered, by the remaining wall panels 20 themselves. Accordingly, with the deployment initiating wall panel 20 being raised or lowered, at least in part via the deployment system 100, all of the wall panels 20 are raised lowered, and the storage compartment 14 is deployed.

With each of the wall panels 20 otherwise free for selective pivotal movement about its hinged connection with the base 12, the deployment system 100 includes strap systems 102 that interconnect the wall panels 20, and make their pivotal movements, under which the wall panels 20 may be raised to their upright orientations and lowered to their stowed orientations, interdependent.

In the illustrated example of the storage compartment 14, the deployment system 100 has two strap systems 102 that each employ one or more straps to connect a laterally central or other inboard portion of one underlying wall panel 20 to the side edges 30c and 30d or other outboard portions of its two adjacent overlying wall panels 20. The one or more straps of each strap system 102 may be constructed partially or entirely from generally flexible materials, such as rubber, woven nylon fabric, cotton or polyethylene, for example. The one or more straps of each strap system 102 may be connected to the inboard portion of one underlying wall panel 20, and across the underlying wall panel 20, to the outboard portions of its two adjacent overlying wall panels 20, by stitching or another suitable attachment mechanism, such as an adhesive.

Although each illustrated strap system 102 employs a single strap to connect the inboard portion of an underlying wall panel 20 to the outboard portions of its two adjacent overlying wall panels 20, one or both of the strap systems 102 could employ multiple straps to connect the inboard portion of an underlying wall panel 20 to the outboard portions of its two adjacent overlying wall panels 20. In the case where each strap system 102 employs a single strap, this strap may be looped through an underlying wall panel 20 to make its connection thereto. This connection may be reinforced by stitching or another suitable attachment mechanism, such as an adhesive.

In the deployment of the storage compartment 14, each strap system 102 imparts raising and lowering forces, as the case may be, between an underlying wall panel 20 and its two adjacent overlying wall panels 20. To do this effectively, each strap system 102 connects the inboard portion of an underlying wall panel 20 to the outboard portions of its two adjacent overlying wall panels 20 substantially without slack. When the storage compartment 14 is deployed to either its collapsed condition or its open condition, the strap employed by each strap system 102 spans an underlying wall panel 20, from its connection to the inboard portion thereof, to its connections to the outboard portions of its two adjacent overlying wall panels 20. In the case of the collapsed condition, the strap employed by each strap system 102 spans an underlying wall panel 20 towards the bottom edge 30a thereof while, in the case of the open condition, the strap employed by each strap system 102 spans an underlying wall panel 20 towards the side edges 30c and 30d thereof. In either case, the strap employed by each strap system 102 is sized to span an underlying wall panel 20 substantially without slack and, as a result, is substantially taut between the underlying wall panel 20 and its two adjacent overlying wall panels 20.

To support the generation of leverage between an underlying wall panel 20 and its two adjacent overlying wall panels 20, each strap system 102 connects the inboard portion of an underlying wall panel 20 proximate to the top edge 30b thereof, to the outboard portions of its two adjacent overlying wall panels 20 proximate to the top edges 30b thereof. Accordingly, the strap employed by each strap system 102 makes its connection to an underlying wall panel 20 at the inboard portion thereof proximate to its top edge 30b, and to its two adjacent overlying wall panels 20 at the outboard portions thereof proximate to their top edges 30b.

With the deployment system 100 and its strap systems 102, in the deployment of the storage compartment 14, the deployment initiating wall panel 20 may be either any overlying wall panel 20 or any underlying wall panel 20.

To deploy the storage compartment 14 from its collapsed condition to its open condition in the case where the deployment initiating wall panel 20 is an overlying wall panel 20, the deployment initiating overlying wall panel 20 is raised by a user to its upright orientation. In response to this, the straps employed by the two strap systems 102 to connect the deployment initiating overlying wall panel 20 to its two adjacent underlying wall panels 20, being or quickly becoming taut, respectively raise the two adjacent underlying wall panels 20 away from each other towards their upright orientations. In response to that, respective side edges 30c and 30d of the two adjacent underlying wall panels 20 furthest from the deployment initiating overlying wall panel 20 slidingly engage the inside 22 of the remaining overlying wall panel 20 and thereby raise it towards its upright orientation.

To deploy the storage compartment 14 from its collapsed condition to its open condition in the case where the deployment initiating wall panel 20 is an underlying wall panel 20, the deployment initiating underlying wall panel 20 is raised by a user to its upright orientation. In response to this, the side edges 30c and 30d of the deployment initiating underlying wall panel 20 slidingly engage the insides 22 of the two adjacent overlying wall panels 20 and thereby respectively raise them away from each other towards their upright orientations. In response to that, the strap employed by the strap system 102 to connect the two adjacent overlying wall panels 20 to the remaining underlying wall panel 20, being or quickly becoming taut, raises it towards its upright orientation.

In some cases, in the deployment of the storage compartment 14 from its collapsed condition to its open condition via the deployment system 100, the wall panels 20 may be completely raised with the deployment initiating wall panel 20 being raised. Otherwise, some wall panels 20 may be partially raised with the deployment initiating wall panel 20 being raised, with a user completing the raising of any partially raised wall panels 20. In any case, all of the wall panels 20 are at least partially raised, and the storage compartment 14 is deployed from its collapsed condition to its open condition, at least partially, via the deployment system 100. Since a user may raise the deployment initiating wall panel 20 with one hand, and complete the raising of partially raised wall panels 20, if any, with one hand, the deployment system 100 supports one-handed deployment of the storage compartment 14 from its collapsed condition to its open condition.

In addition to their role in the deployment of the storage compartment 14 via the deployment system 100, the two strap systems 102 support the maintenance of the storage compartment 14 in its open condition. More specifically, since the strap employed by each strap system 102 is substantially taut between one underlying wall panel 20 and its two adjacent overlying wall panels 20 when the storage compartment 14 is deployed to its open condition, the two strap systems 102 prevent over-travel of the wall panels 20 beyond their upright orientations.

To assist a user raising a deployment initiating wall panel 20, the deployment system 100 may include a pull handle 104 connected to the deployment initiating wall panel 20, by which a user may raise it to its upright orientation. In the illustrated example of the storage compartment 14, the pull handle 104 is connected to one underlying wall panel 20 to establish it as the primary deployment initiating wall panel 20. The pull handle 104 may be connected to a laterally central or other inboard portion of the underlying wall panel 20, for instance, where the strap employed by a strap system 102 connects to it.

In this location, the pull handle 104 may project between the top edges 30b of the overlying wall panels 20 and beyond their outsides 24, and beyond the remainder of the storage compartment 14, when the storage compartment 14 is in its collapsed condition. An optional releasable fastener may connect the pull handle 104 to the outside 24 of one of the overlying wall panels 20 to hold it against the outside 24 of the overlying wall panel 20. The releasable fastener may have any of a variety of configurations, including but not limited to a hook and loop fasteners, zippers, snaps, hooks and magnets, to name a few. To additionally or alternatively establish an underlying wall panel 20 as the primary deployment initiating wall panel 20, and assist a user raising it, the top edges 30b of the overlying wall panels 20 may define a relief 106 between them that coincides with the top edge 30b of the underlying wall panel 20.

To deploy the storage compartment 14 from its open condition to its collapsed condition in the case where the deployment initiating wall panel 20 is an overlying wall panel 20, the deployment initiating overlying wall panel 20 is lowered by a user to its stowed orientation. In response to this, the inside 22 of the deployment initiating overlying wall panel 20 slidingly engages respective side edges 30c and 30d of the two adjacent underlying wall panels 20 closest to the deployment initiating overlying wall panel 20 and thereby lowers them towards each other towards their stowed orientations. In response to that, the straps employed by the two strap systems 102 to connect the two adjacent underlying wall panels 20 to the remaining overlying wall panel 20, being or quickly becoming taut, lower it towards its stowed orientation.

To deploy the storage compartment 14 from its open condition to its collapsed condition in the case where the deployment initiating wall panel 20 is an underlying wall panel 20, the deployment initiating underlying wall panel 20 is lowered by a user to its stowed orientation. In response to this, the straps employed by the two strap systems 102 to connect the deployment initiating underlying wall panel 20 to its two adjacent overlying wall panels 20, being or quickly becoming taut, respectively lower the two adjacent overlying wall panels 20 towards each other towards their stowed orientations. In response to that, the insides 22 of the two adjacent overlying wall panels 20 slidingly engage the side edges 30c and 30d of the remaining underlying wall panel 20 and thereby lower it towards its stowed orientation.

In some cases, in the deployment of the storage compartment 14 from its open condition to its collapsed condition via the deployment system 100, the wall panels 20 may be completely lowered with the deployment initiating wall panel 20 being lowered. Otherwise, a user may initiate the lowering of some wall panels 20, with the lowering of any partially lowered wall panels 20 being completed with the deployment initiating wall panel 20 being lowered. In any case, all of the wall panels 20 are at least partially lowered, and the storage compartment 14 is deployed from its open condition to its collapsed condition, at least partially, via the deployment system 100. Since a user may initiate the lowering of some wall panels 20, if necessary, with one hand, and lower the deployment initiating wall panel 20 with one hand, the deployment system 100 supports one-handed deployment of the storage compartment 14 from its open condition to its collapsed condition.

Although the operation of the deployment system 100 is described with reference to supporting one-handed deployment of the storage compartment 14, the deployment system 100 could also support two-handed deployment of the storage compartment 14. In that instance, it will be understood that, with the deployment system 100, a user can initiate deployment of the storage compartment 14 by raising or lowering two of its wall panels 20. In the case where these so-called deployment initiating wall panels 20 are raised, the deployment system 100 could raise at least one of the remaining wall panels 20. Similarly, in the case where the deployment initiating wall panels 20 are lowered, the deployment system 100 could lower at least one of the remaining wall panels 20.

Figure 13:
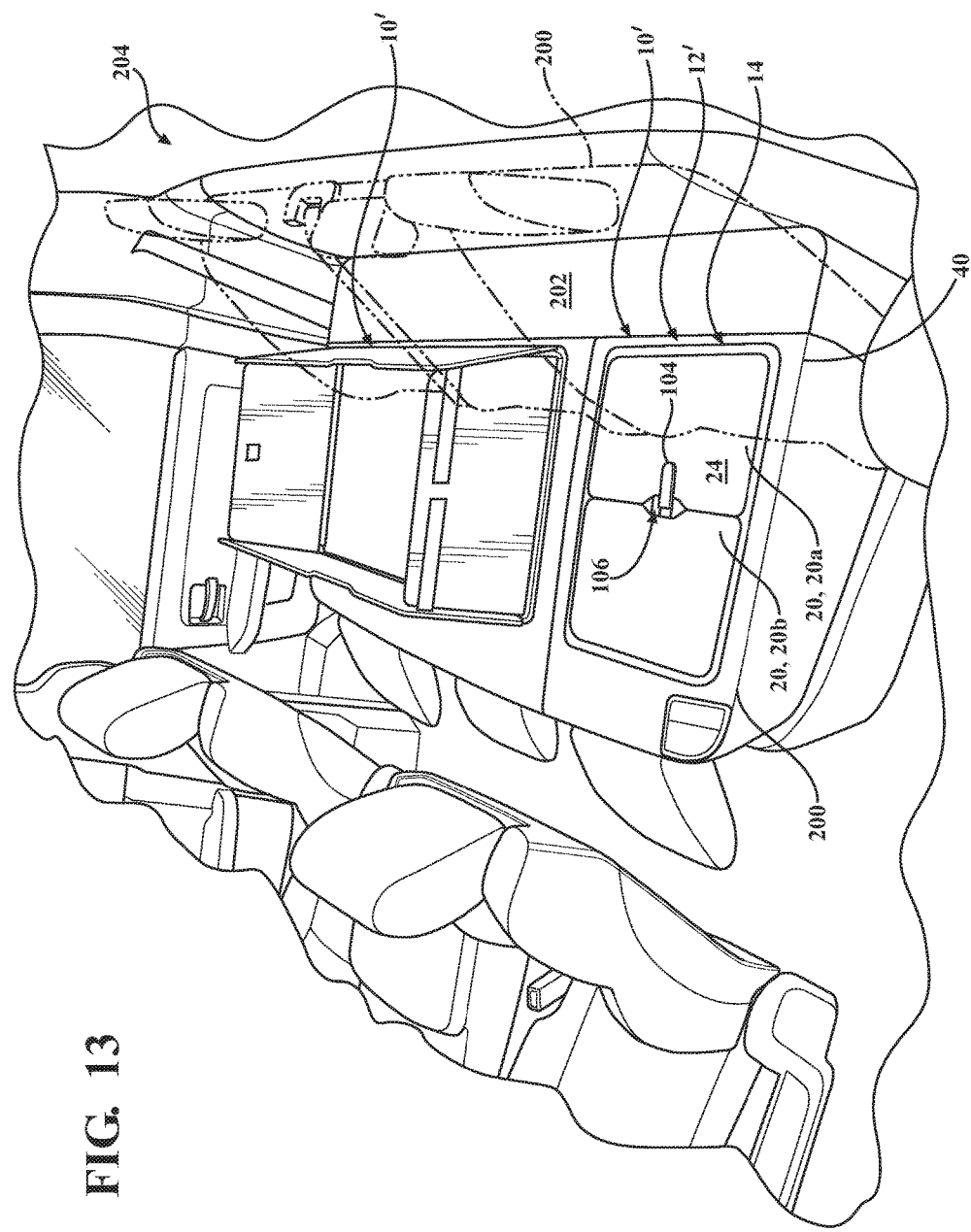
FIG. 13 is a perspective view of an example implementation of the cargo organizer on a seatback of a vehicle.

The cargo organizer 10 may be sized, shaped and otherwise configured for arrangement in an inner compartment of a vehicle. In addition to serving, for example, as a cargo mat that doubles as a selective provider of storage space, as shown in FIG. 13, cargo organizers 10' may, for instance, be respectively included on the back of foldable seatbacks 200. Each seatback 200, when folded, forms part of a generally horizontal floor 202 of a rear cargo area 204, arranging its included cargo organizer 10' on the floor 202 for securing objects within the cargo area 204. On the other hand, each seatback 200, when not folded, arranges its included cargo organizer 10' out of the way of the rear cargo area 204.

Each of the included cargo organizers 10' may include a base 12' sized, shaped and otherwise configured to overlay the back its seatback 200. Although the remainder of the included cargo organizers 10' may be similarly constructed as the cargo organizer 10, the included cargo organizers 10' may optionally, as shown, include just one collapsible storage compartment 14.

In these and other configurations, the cargo organizers 10, 10' may be standalone units sized, shaped and otherwise configured for arrangement in an inner compartment of a vehicle. The bases 12, 12' of the cargo organizers 10, 10' may include optional releasable fasteners to connect the cargo organizers 10, 10' to an underlying vehicle surface that defines an inner compartment of the vehicle into which a respective cargo organizer 10, 10' is arranged. Alternatively, a respective cargo organizer 10, 10' could be included as a permanently affixed component of a vehicle for arrangement in one of its inner compartments.

It is intended that the scope of the present methods and apparatuses be defined by the following claims. However, it must be understood that the disclosed systems and methods for notifying a user of an available voice command shortcut may be practiced otherwise than is specifically explained and illustrated without departing from its spirit or scope. It should be understood by those skilled in the art that various alternatives to the configurations described herein may be employed in practicing the claims without departing from the spirit and scope as defined in the following claims. The scope of the disclosed systems and methods should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. Furthermore, all terms used in the claims are intended to be given their broadest reasonable constructions and their ordinary meanings as understood by those skilled in the art unless an explicit indication to the contrary is made herein. In particular, use of the singular articles such as "a," "the," "said," etc., should be read to recite one or more of the indicated elements unless a claim recites an explicit limitation to the contrary. It is intended that the following claims define the scope of the device and that the method and apparatus within the scope of these claims and their equivalents be covered thereby. In sum, it should be understood that the device is capable of modification and variation and is limited only by the following claims.

What is claimed is:

1. A cargo organizer, comprising:
   a base;
   a storage compartment supported by the base, the storage compartment including a plurality of wall panels each having a hinged connection with the base and pivotable about its hinged connection with the base between a stowed orientation and an upright orientation, the storage compartment selectively deployable between a collapsed condition, where each wall panel is lowered to its stowed orientation, and an open condition, where each wall panel is raised to its upright orientation, wherein in the collapsed condition, the wall panels include an underlying wall panel and two adjacent overlying wall panels in spaced opposition about the underlying wall panel; and
   a deployment system for the storage compartment, the deployment system including a strap system that connects a widthwise inboard portion of the underlying wall panel to respective widthwise outboard portions of the two adjacent overlying wall panels to thereby impart deployment-supporting forces therebetween during deployment of the storage compartment.

2. The cargo organizer of claim 1, wherein each of the underlying wall panel and the two adjacent overlying wall panels is generally not foldable over itself.

3. The cargo organizer of claim 1, wherein the strap system connects the widthwise inboard portion of the underlying wall panel to the respective widthwise outboard portions of the two adjacent overlying wall panels substantially without slack.

4. The cargo organizer of claim 1, wherein the widthwise inboard portion of the underlying wall panel is a laterally central portion thereof, and the respective widthwise outboard portions of the two adjacent overlying wall panels are respective edges thereof adjacent their respective hinged connections with the base.

5. The cargo organizer of claim 1, wherein the widthwise inboard portion of the underlying wall panel is proximate to an edge thereof opposite its hinged connection with the base, and the respective widthwise outboard portions of the two adjacent overlying wall panels are proximate to respective edges thereof opposite their respective hinged connections with the base.

6. The cargo organizer of claim 1, wherein the strap system employs a single strap to connect the widthwise inboard portion of the underlying wall panel to the respective widthwise outboard portions of the two adjacent overlying wall panels, and the strap is looped through the underlying wall panel to make its connection thereto.

7. The cargo organizer of claim 1, wherein the deployment system includes a pull handle connected to the underlying wall panel and, in the collapsed condition, the two adjacent overlying wall panels have immediately adjacent respective edges, between which the pull handle projects, opposite their respective hinged connections with the base.

8. The cargo organizer of claim 1, wherein, in the collapsed condition, the two adjacent overlying wall panels have immediately adjacent respective edges, between which a relief is defined, opposite their respective hinged connections with the base, and the relief coincides with an edge of the underlying wall panel opposite its hinged connection with the base.

9. The cargo organizer of claim 1, wherein the wall panels each have a hinged connection with the base at respective edges thereof that are arranged end to end in a substantially closed loop.

10. The cargo organizer of claim 1, wherein the base defines a recess coinciding with the storage compartment into which at least the underlying wall panel is lowered in its stowed orientation.

11. A cargo organizer, comprising:
a base;
a storage compartment supported by the base, the storage compartment including a plurality of wall panels each having a hinged connection with the base and pivotable about its hinged connection with the base between a stowed orientation and an upright orientation, the storage compartment selectively deployable between a collapsed condition, where each wall panel is lowered to its stowed orientation, and an open condition, where each wall panel is raised to its upright orientation, wherein in the collapsed condition, the wall panels include an overlying wall panel and two adjacent underlying wall panels in spaced opposition about the overlying wall panel; and
a deployment system for the storage compartment, the deployment system including a first strap system that connects a widthwise inboard portion of a first of the two adjacent underlying wall panels to a first widthwise outboard portion of the overlying wall panel to thereby impart deployment-supporting forces therebetween during deployment of the storage compartment, and a second strap system that connects a widthwise inboard portion of a second of the two adjacent underlying wall panels to a second widthwise outboard portion of the overlying wall panel to thereby impart deployment-supporting forces therebetween during deployment of the storage compartment.

12. The cargo organizer of claim 11, wherein each of the overlying wall panel and the two adjacent underlying wall panels is generally not foldable over itself.

13. The cargo organizer of claim 11, wherein the first strap system connects the widthwise inboard portion of the first adjacent underlying wall panel to the first widthwise outboard portion of the overlying wall panel substantially without slack, and the second strap system connects the widthwise inboard portion of the second adjacent underlying wall panel to the second widthwise outboard portion of the overlying wall panel substantially without slack.

14. The cargo organizer of claim 11, wherein the respective widthwise inboard portions of the first adjacent underlying wall panel and the second adjacent underlying wall panel are respective laterally central portions thereof, and the first widthwise outboard portion and the second widthwise outboard portion of the overlying wall panel are respective edges thereof adjacent its hinged connection with the base.

15. The cargo organizer of claim 11, wherein the respective widthwise inboard portions of the first adjacent underlying wall panel and the second adjacent underlying wall panel are proximate to respective edges thereof opposite their respective hinged connections with the base, and the first widthwise outboard portion and the second widthwise outboard portion of the overlying wall panel are proximate to an edge thereof opposite its hinged connection with the base.

16. The cargo organizer of claim 11, wherein the wall panels each have a hinged connection with the base at respective edges thereof that are arranged end to end in a substantially closed loop.

17. The cargo organizer of claim 11, wherein the base defines a recess coinciding with the storage compartment into which at least the two adjacent underlying wall panels are lowered in its stowed orientation.

18. A cargo organizer, comprising:
a base;
a storage compartment supported by the base, the storage compartment including a first side wall panel and a second side wall panel in spaced opposition, and a first end wall panel and a second end wall panel in spaced opposition, each having a hinged connection with the base at respective bottom edges thereof that are arranged end to end in a substantially closed loop, and pivotable about its bottom edge between a stowed orientation and an upright orientation, but generally not foldable over itself, the storage compartment selectively deployable between (i) a collapsed condition, where the first end wall panel and the second end wall panel are lowered towards each other to their stowed orientations, and the first side wall panel and the second side wall panel are lowered towards each other to their stowed orientations in an overlying relationship with the first end wall panel and the second end wall panel, with the first side wall panel and the second side wall panel having immediately adjacent respective top edges opposite their respective bottom edges, and (ii) an open condition, where each wall panel is raised to its upright orientation; and a deployment system for the storage compartment, the deployment system including a first strap system that connects a widthwise inboard portion of the first end wall panel to respective widthwise outboard portions of the first side wall panel and the second side wall panel substantially without slack to thereby impart deployment-supporting forces therebetween during deployment of the storage compartment, and a second strap system that connects a widthwise inboard portion of the second end wall panel to respective opposing widthwise outboard portions of the first side wall panel and the second side wall panel substantially without slack to thereby impart deployment-supporting forces therebetween during deployment of the storage compartment, wherein the first side wall panel, the second side wall panel, the first end wall panel and the second end wall panel are not otherwise interconnected for movement.

19. The cargo organizer of claim 18, wherein the deployment system includes a pull handle connected to the first end wall panel and, in the collapsed condition, the pull handle projects between the respective top edges of the first side wall panel and the second side wall panel.

20. The cargo organizer of claim 18, wherein, in the collapsed condition, a relief is defined between the respective top edges of the first side wall panel and the second side wall panel, and the relief coincides with a top edge of the first end wall panel opposite its bottom edge.

* * * * *